United States Patent
Shimanuki et al.

(10) Patent No.: US 7,087,328 B2
(45) Date of Patent: Aug. 8, 2006

(54) FUEL CELL SYSTEM AND HUMIDIFICATION METHOD

(75) Inventors: Hiroshi Shimanuki, Saitama (JP);
Toshikatsu Katagiri, Saitama (JP);
Yoshio Kusano, Saitama (JP);
Motohiro Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 567 days.

(21) Appl. No.: 10/055,249

(22) Filed: Jan. 22, 2002

(65) Prior Publication Data
US 2002/0098395 A1    Jul. 25, 2002

(30) Foreign Application Priority Data
Jan. 22, 2001    (JP) .............................. 2001-012740

(51) Int. Cl.
*H01M 8/04*    (2006.01)
(52) U.S. Cl. .............................. 429/13; 429/26; 429/34
(58) Field of Classification Search .................... None
See application file for complete search history.

(56) References Cited

U.S. PATENT DOCUMENTS

| | | | | |
|---|---|---|---|---|
| 5,965,288 A | * | 10/1999 | Okamoto | 429/26 |
| 6,106,964 A | * | 8/2000 | Voss et al. | 429/20 |
| 6,416,895 B1 | * | 7/2002 | Voss et al. | 429/20 |
| 6,596,429 B1 | * | 7/2003 | Shimanuki et al. | 429/34 |
| 2002/0041989 A1 | * | 4/2002 | Shimanuki et al. | 429/34 |
| 2002/0172848 A1 | * | 11/2002 | Ding | 429/26 |

FOREIGN PATENT DOCUMENTS

| JP | 06-132038 | 5/1994 |
|---|---|---|
| JP | 08-273687 | 10/1996 |

* cited by examiner

*Primary Examiner*—John S. Maples
(74) *Attorney, Agent, or Firm*—Lahive & Cockfield, LLP; Anthony A. Laurentano, Esq.

(57) ABSTRACT

The invention provides a fuel cell system, which has a humidifying apparatus to supply the sufficient moisture to the solid electrolyte membrane of a fuel cell and is capable of preventing the mixture of fuel and oxidant gases in the apparatus. The hydrogen gas supplied to the anode of the fuel cell is humidified in the first humidifier and the air Ad supplied to the cathode is humidified in the second humidifier. The first humidifier has the non-porous water permeable membrane, which is permeable only to the moisture of the cathode off-gas discharged from the cathode of the fuel cell, on the other hand the second humidifier has the porous water permeable membrane, which is permeable to the moisture of the cathode off-gas.

8 Claims, 5 Drawing Sheets

FUEL CELL SYSTEM AND HUMIDIFICATION METHOD

FIELD OF THE INVENTION

The present invention relates to a fuel cell system including a humidifying apparatus, which supplies the humidified fuel and oxidant gases to the fuel cell, and its humidification method.

BACKGROUND OF THE INVENTION

A solid-electrolyte fuel cell (hereinafter referred to as a fuel cell), which has been developed in recent years as a power source for electrical vehicles, generates electrical power by utilizing the electrochemical reaction of the fuel and oxidant gases. The fuel gas is ionized at the anode and the oxidant gas is ionized at the cathode. The ions of fuel gas (protons, hydrogen ions) travel by means of the solid-electrolyte membrane and react with the oxygen ions at the cathode to produce water, thus generating electrical power.

As one of the parameters governing the efficiency of the power generation of fuel cell, the ion conductivity of hydrogen ion is given, which travels in the solid-electrolyte membrane. The higher the ion conductivity is, the more the electrical power generation resulting from the electrochemical reaction will be, since the number of hydrogen ions which can travel in the solid-electrolyte membrane per time increases. On the other hand, when the ion conductivity is low, the amount of electrical power generation will decrease, since the number of hydrogen ions which can travel in the solid-electrolyte membrane per time decreases.

Several inventions related to raising the ion conductivity of solid-electrolyte membrane have been provided and a humidifying apparatus for fuel cell, for example, is disclosed in the patent gazette Japanese Laid-Open Patent 8-273687.

In the humidifying apparatus according to Japanese Laid-Open Patent 8-273687, the fuel gas is humidified by the cooling fluid of the fuel cell and the drying of the solid-electrolyte membrane is prevented by supplying the humidified fuel gas to the fuel cell. The humidifying apparatus is equipped with the hollow fiber membrane. The fuel gas flows inside the hollow fiber membrane and the water flows outside it. This hollow fiber membrane is capable of separating the liquid phase outside the hollow fiber membrane and the gas phase inside it, and making the permeation of the moisture from the side of liquid phase with higher water vapor partial pressure to the side of gas phase, which has relatively lower water vapor partial pressure. The moisture moved from the side of liquid phase to the side of gas phase through the solid-electrolyte membrane is evaporated by the flow of fuel gas, thus converting the fuel gas into the humidified fuel gas containing a given amount of water vapor.

However, when the moisture contained in the off-gas discharged from the fuel cell is used for the humidification of fuel gas, gas molecules such as oxygen molecules possibly permeate the hollow fiber membrane depending on the type of it, since the off-gas is discharged with the oxidant gas containing the oxygen gas before reaction. If the oxygen gas in the off-gas permeates the hollow fiber membrane and mixes with the fuel gas, the fuel gas containing the oxygen gas will be supplied to the anode. In this case, the fuel and oxygen gases possibly react to create heats with the platinum electrode of the anode as a catalyst before the electrochemical reaction, sometimes causing the degradation of the solid-electrolyte membrane and the platinum electrode. Further when this type of hollow fiber membrane is used, a purge line and a control device are required for purging the gas in the pipes at the starting of fuel cell, since the fuel and oxygen gases possibly mix through the hollow fiber membrane during the prolonged non-operation time period of fuel cell.

The optimization of humidifying means as the total fuel cell system has been desired, like an encouraged humidification of oxidant gas, so as to achieve the high efficiency of power generation by humidifying.

SUMMARY OF THE INVENTION

Therefore, the object of the present invention is to prevent the gas mixture in the humidifying apparatus provided for maintaining the ion conductivity of the solid-electrolyte membrane of fuel cell, and enable an efficient and stable humidification of the gas in the humidifying apparatus.

In one aspect, the present invention provides a fuel cell system, which has a fuel cell that generates electrical power by the electrochemical reaction between the fuel gas supplied to the anode and the oxidant gas supplied to the cathode, and a humidifying apparatus that humidifies the gases with water permeable membranes. The fuel cell system includes a first humidifier, which is provided in the humidifying apparatus, and non-porous water permeable membranes, which are provided in the first humidifier and humidify the fuel gas supplied to the anode by means of the moisture contained off-gas discharged from the fuel cell.

The system thus enables an appropriate and enough humidification for the fuel gas. The non-porous water permeable membrane referred to is the membrane that does not have pores, for example, 10 nm or more of the diameter but is permeable only to the moisture in a fluid with ion hydration. The non-porous water permeable membrane is capable of preventing the mixture of the fuel and oxidant gases reliably in the humidifying apparatus, since it is permeable only to moisture even if the off-gas contains the oxidant gas before reaction.

In another aspect, the present invention provides the fuel cell system in which the humidifying apparatus has a second humidifier, and the second humidifier has porous water permeable membranes, which humidify the oxidant gas supplied to the cathode by means of the off-gas.

The system thus enables an enough humidification for the fuel gas. The porous water permeable membrane referred to is the membrane that has a large number of water molecule permeable pores (for example the diameter of 10 nm) and is permeable to the moisture in a fluid with capillary condensation. The porous water permeable membrane is not only permeable to moisture rapidly but also capable of humidifying without the degradation of the water permeable membrane even if the temperature of oxidant gas is high by pressurized compression, since it has a good heat resistance. Therefore, it will enable a sufficient and stable moisture supply to the fuel cell. Though the water permeable membrane is possibly permeable to the oxidant gas before reaction due to its porosity, it will not be problematic because the humidified gas is also the oxidant gas.

In another aspect, the invention provides the fuel cell system in which the fuel cell system and the first and second humidifiers are disposed in series for the flow of the off-gas.

By disposing the fuel cell system and the first and second humidifiers in series, the fuel and oxidant gases are humidified respectively with a simple structure, since the complex piping such as an off-gas distributor is not necessary. Either the first or second humidifier may come first relative to the fuel cell.

In another aspect, the invention provides a method of humidifying the fuel and oxidant gases supplied to a fuel cell in a humidifying apparatus, including the introduction of the moisture contained off-gas discharged from the fuel cell into the humidifying apparatus, the moisture reception of the fuel gas from the off-gas through non-porous water permeable membranes in the humidifying apparatus, the moisture reception of the oxidant gas from the off-gas through water permeable membranes in the humidifying apparatus, and the supply of the respective humidified fuel and oxidant gases to the fuel cell.

The humidifying apparatus, into which the off-gas has been introduced, is thus capable of humidifying the fuel gas through the non-porous water permeable membrane as well as preventing the mixture with the oxidant gas. And it can humidify the oxidant gas with the water permeable membrane. Therefore, the humidifying apparatus is capable of supplying enough moisture to the fuel cell by means of both fuel and oxidant gases. The water permeable membrane for humidifying the oxidant gas may be either porous or non-porous.

In another aspect, the invention provides the humidifying apparatus in which the non-porous water permeable membranes transport water by ion hydration. Also, in another aspect, the invention provides the humidifying apparatus in which the non-porous water permeable membranes transport water by ion hydration.

This type of non-porous water permeable membrane is not permeable to the gas molecules in the off-gas but only to the moisture by ion hydration. Therefore, it is capable of humidifying the fuel gas as well as preventing the mixture of gases.

In another aspect, the invention provides the fuel cell system in which the porous water permeable membranes are permeable to moisture by capillary condensation.

This type of porous water permeable membrane is permeable to the water reliably by capillary condensation. It is also capable of humidifying stably even if the temperature of oxidant gas is high, since it has a good heat resistance.

DESCRIPTION OF THE PREFERRED EMBODIMENTS

The preferred embodiment of the present invention will now be described in detail with reference to the accompanying drawings.

Figure 1:
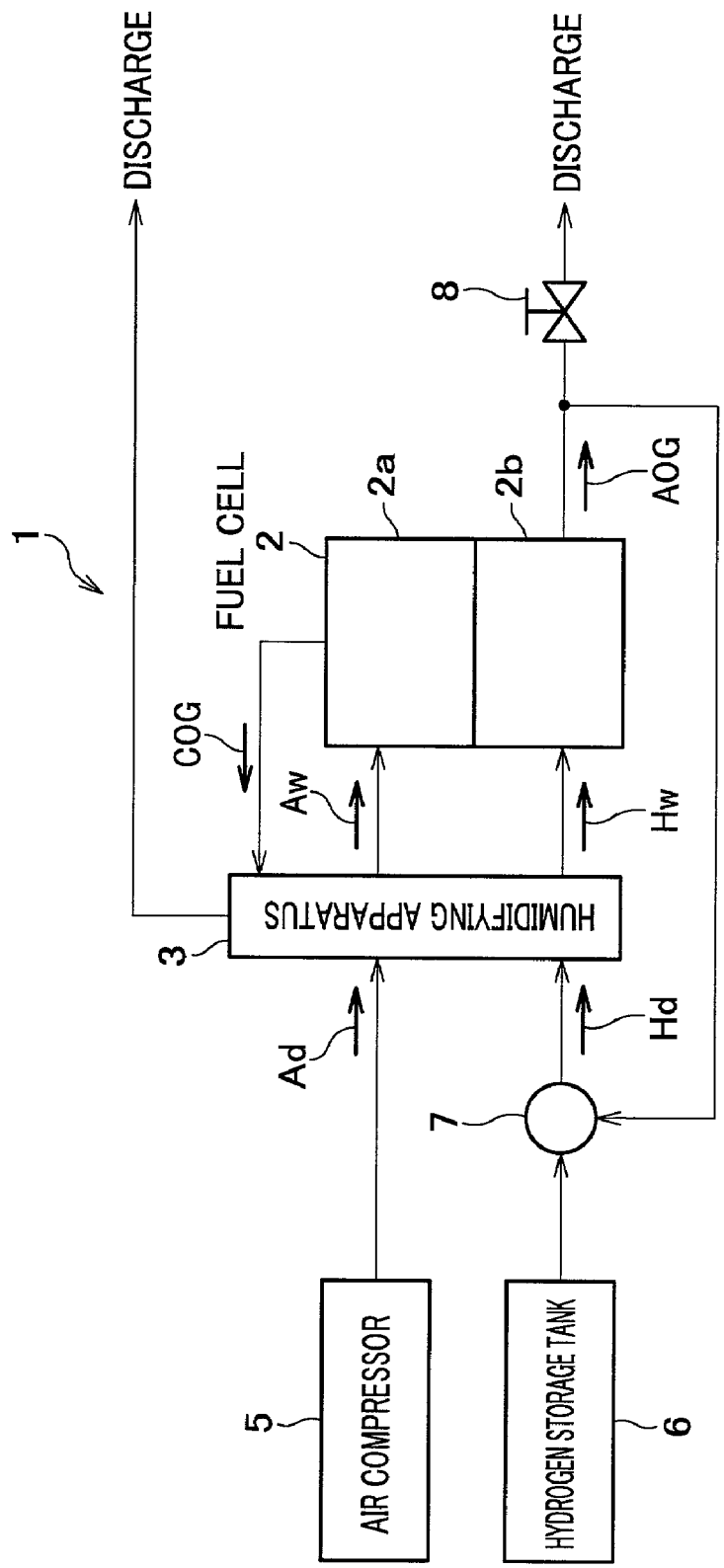
FIG. 1 is an overall view illustrating the structure of a fuel cell system according to the preferable embodiment of the present invention.

The overall structure of the fuel cell system according to the embodiment of the invention with the reference to FIG. 1.

A fuel cell system 1 includes a fuel cell 2, a humidifying apparatus 3, an air compressor 5 and a hydrogen storage tank 6.

The fuel cell 2 employs the solid-electrolyte membrane and has a cathode 2a (oxygen electrode), to which the humidified air Aw is supplied as an oxidant gas, and an anode 2b (hydrogen electrode), to which the humidified hydrogen gas (hereinafter referred to as humidified hydrogen gas Hw) is supplied. It generates electrical power by electrochemically reacting the humidified hydrogen gas Hw and the oxygen gas contained in the humidified air Aw supplied to the respective electrodes.

The humidified air Aw is produced from the low humid air Ad taken from the atmosphere by humidifying it in the humidifying apparatus 3 as well as compressing it in the air compressor 5.

The humidified hydrogen gas Hw is produced from the hydrogen gas Hd loaded into the hydrogen storage tank 6 at a hydrogen gas station by humidifying it in the humidifying apparatus 3.

The humidification of the air Ad and hydrogen gas Hd by the humidifying apparatus 3 is performed by receiving the moisture from the moisture-rich cathode off-gas COG discharged from the cathode 2a of the fuel cell 2. The details will be described later.

At the cathode 2a of the fuel cell 2, the cathode off-gas COG containing much water is produced, which is the reaction product of humidified hydrogen gas Hw and oxygen gas. The cathode off-gas COG is introduced into the humidifying apparatus 3 and then discharged into the atmosphere.

On the other hand, at the anode 2b, the anode off-gas AOG containing the hydrogen gas Hd before reaction is produced. The anode off-gas AOG is introduced into an injector 7 of the hydrogen gas Hd and supplied to the fuel cell 2 again. When the anode off-gas AOG is discharged into the atmosphere, a valve 8 provided in the latter stage of the fuel cell 2 is opened.

The structure and operation of the fuel cell 2 will be described.

The fuel cell 2 has the anode 2b and the cathode 2a, which sandwich the solid-electrolyte membrane (not shown). The electrodes having platinum group catalyst are provided for the respective anode and cathode. The humidified hydrogen gas Hw is flowed for the anode 2b and the humidified air Aw is flowed for the cathode 2a. As a solid-electrolyte membrane, a polymer membrane, for example, a proton exchange membrane, perphlorocarbon sulfonic acid membrane has been known. This solid-electrolyte membrane has many proton exchange bases in the polymer and provides high proton conductivity under the room temperature by saturating water content. Therefore, the proton (hydrogen ion) generated at the anode 2b can reach the cathode 2a traveling through the solid-electrolyte membrane easily. The proton reached the cathode 2a reacts with the oxygen ion generated at the anode 2b to produce water. The produced water is discharged through the outlet of the cathode 2a side as cathode off-gas COG along with the humidified air Aw, which contains elements before reaction. When the anode 2b and the cathode 2a are connected electrically through the external load to make a circuit, the electrons generated on the ionization of hydrogen will flow the circuit and the amount of electron will be the electrical power generation of the fuel cell 2.

As the parameters governing the electrical power generated by the fuel cell 2, the number and size of cells including electrodes and solid-electrolyte membranes, the quantity of humidified hydrogen gas Hw and air Aw supplied and the proton conductivity of the solid-electrolyte membrane are given. Of these parameters the proton conductivity of the solid-electrolyte membrane will be described.

The proton conductivity shows the degree of freedom for a proton traveling in the solid-electrolyte membrane. The higher the proton conductivity is, the greater the reaction frequency of the proton (hydrogen ion) and the oxygen ion will be to result in the increase of electrical power generation, since the proton (hydrogen ion) travels from the anode 2b to the cathode 2a more easily. On the other hand, the lower the proton conductivity is, the less the reaction of the proton (hydrogen ion) and the oxygen ion will be to result in the decrease of electrical power generation, since the permeability of proton decreases.

The proton conductivity will decrease when the solid-electrolyte membrane is dry. Therefore, the humidifying apparatus 3 according to the embodiment of the invention supplies the sufficient water to the solid-electrolyte membrane to increase the proton conductivity of the solid-electrolyte membrane by humidifying the hydrogen gas Hd and the air Ad, thus enabling the improvement of the efficiency of power generation and its stabilization.

The humidifying apparatus 3 according to the embodiment of the invention will be described with the reference to FIG. 2, FIG. 3(*a*) and FIG. 3(*b*).

Figure 2:
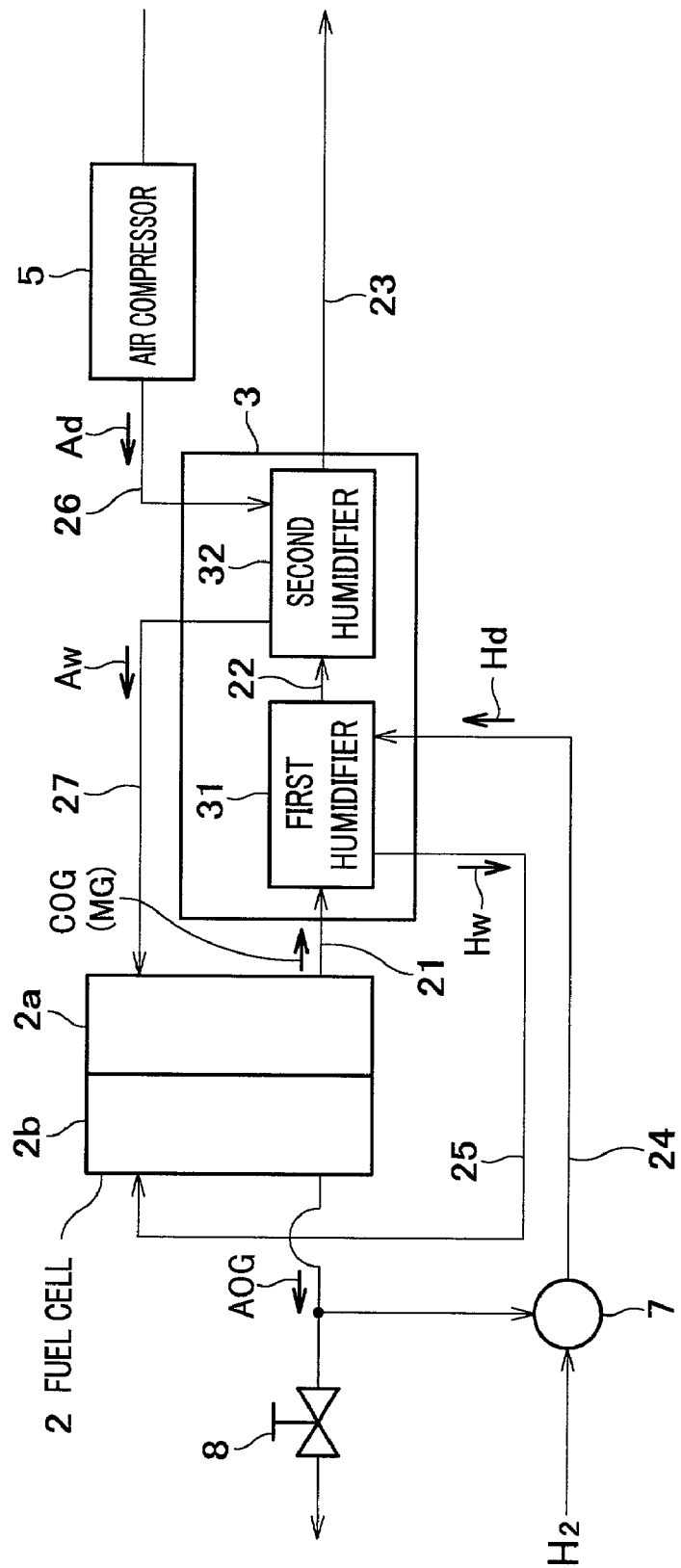
FIG. 2 is a view illustrating the structure of a fuel cell and a humidifying apparatus according to the preferable embodiment of the present invention.

As shown in FIG. 2, the humidifying apparatus 3 has a first humidifier 31, which is placed near the fuel cell 2, and a second humidifier 32 placed after the first humidifier 31, relative to the flow direction of the cathode off-gas COG. The humidifying apparatus 3 is to humidify the anode 2b sufficiently with the off-gas (cathode off-gas COG) discharged from the fuel cell 2. As a matter of convenience, the cathode off-gas COG is referred to as moistening off-gas MG in the following explanation.

The first humidifier 31, which is connected to the outlet of the cathode 2a of the fuel cell 2 with a pipe 21, humidifies the hydrogen gas Hd supplied through a pipe 24. The humidified hydrogen Hw is supplied to the anode 2b of the fuel cell 2 through a pipe 25.

As shown in FIGS. 3(*a*) and 3(*b*), the first humidifier 31 houses four pieces of hollow fiber membrane module 33 of cylinder-like shape and is of rectangular parallelepiped. Both ends of the respective modules are held by distributors 34 and 35.

The hollow fiber membrane module 33 has a cylinder-like housing 36 and first hollow fiber membranes P1, which are of a large number of water permeable membranes contained in the housing 36 in a bundle. The respective first hollow fiber membranes P1 have the outer diameter of a few tenths of millimeters and are placed in the housing 36 spaced each other to ensure the contact area for the hydrogen gas Hd flowing along outside the first hollow fiber membranes P1. The housing 36 has a plurality of holes 37a and 37b on its circumference. The holes 37a serve as inlets, through which the hydrogen gas Hd enters the hollow fiber membrane module 33, and the holes 37b as outlets, through which the humidified hydrogen gas Hw leaves the hollow fiber membrane module 33. On the other hand, the moistening off-gas MG enters the hollow of the hollow fiber membranes P1 through one end surface 33a of the hollow fiber membrane module 33 and leaves through another end surface 33b of the hollow fiber membrane module 33.

On the side of the distributor 34 placed at one end is provided an off-gas inlet 38, which is for introducing the moistening off-gas MG traveled through the pipe 21 shown in FIG. 2 into each hollow fiber membrane module 33. Also on the top and base of it is provided a hydrogen outlet 39, which is for discharging the humidified hydrogen gas Hw. On the side of the distributor 35 placed at the other end is provided an off-gas outlet 40, which is for discharging the moistening off-gas MG traveled through the hollow fiber membrane module 33 into the pipe 22. Also on the top and base of it a hydrogen inlet 41 is provided, which is for introducing the hydrogen gas Hd into the hollow fiber membrane module 33. The hydrogen inlet 41 is connected to the pipe 24 shown in FIG. 2 and the hydrogen outlet 39 is connected to the pipe 25.

The first hollow fiber membranes P1 provided in the first humidifier 31 are composed of polymer electrolyte membrane. This polymer electrolyte membrane is of ion hydration water permeable membrane and NAFION membrane of Du Pont is given as an example, which employs perfluorocarbon sulfonic acid. Since polymer electrolyte membrane of this type does not have the pores, for example, 10 nm or more in diameter, which the porous polymer membrane to be described later has, it is not permeable to the elements except for the moisture contained in the moistening off-gas MG and the air Ad. The polymer electrolyte membrane has the hydrophobic main chain and the hydrophilic exchange base coexisted in the polymer structure. And the hydrophilic exchange base has ion hydration to catch the moisture by making hydrogen bond with the water molecules. Therefore, when the moistening off-gas MG containing much moisture flows inside the first hollow fiber membranes P1 composed of the polymer electrolyte membranes and the hydrogen gas Hd containing almost no moisture flows outside the first hollow fiber membranes P1 (see FIG. 3(*a*)), the water transport phenomenon will occur. The moisture contained in the moistening off-gas MG is gradually trapped on the inner circumferential surfaces of the first hollow fiber membranes P1 by ion hydration, permeating the first hollow fiber membranes P1 and transferred to the outer circumferential surfaces. And the moisture exuded on the outer circumferential surfaces is evaporated to be water vapor by the flow of the hydrogen gas Hd, which will mix with the hydrogen gas Hd to make the humidified hydrogen gas Hw.

In this connection, since the gases such as oxygen and nitrogen gases other than the moisture of the moistening off-gas MG cannot pass through the polymer electrolyte membrane without the pores described above, the oxygen gas will not mix with the hydrogen gas Hd. The first hollow fiber membranes P1 composed of this type of polymer electrolyte membranes refer to the non-porous water permeable membrane according to the appended claims.

As shown in FIG. 2, the second humidifier 32, which is connected to the first humidifier 31 by a pipe 22, humidifies the air Ad supplied from the compressor 5 through a pipe 26. The air Ad undergone humidification, namely the humidified air Aw is supplied to the cathode 2a of the fuel cell 2 through a pipe 27.

The second humidifier 32 is structurally the same as the first humidifier 31. The second humidifier 32 differs from the first humidifier 31 in using second hollow fiber membranes P2 different from the first hollow fiber membranes P1. The second hollow fiber membranes P2 are housed in the hollow fiber membrane module 33.

The second hollow fiber membranes P2, which are housed in a bundle in the housing 36 of the hollow fiber membrane module 33 for the second humidifier 32, are porous or composed of polymer membrane with many pores (diameter of 10 nm), in which the molecular diffusion can occur. This polymer membrane is permeable to moisture through the pore by capillary condensation. Therefore, when the moistening off-gas MG containing much moisture flows inside the second hollow fiber membranes P2 composed of the polymer electrolyte membranes and the air Ad containing almost no moisture flows outside of the second hollow fiber membranes P2 (see FIG. 3(a)), the moisture condensates on the inner circumferential surfaces of the second hollow membranes P2 or the moisture dispersed in the pores permeates the second hollow membranes P2 by capillary condensation to exude on their outer circumferential surfaces. And the moisture exuded on the outer circumferential surfaces is evaporated to be water vapor by the flow of the air Ad, which will mix with the air Ad to make the humidified air Aw.

The water permeable membrane composed of the polymer membrane is characterized in that it is capable of transporting the evaporated moisture reliably as well as permeable to oxygen gas etc. other than moisture through the pores. The second hollow fiber membranes P2 refer to the porous water permeable membrane according to the appended claims. And the diameter of pore may be more than 10 nm so long as the water molecule can permeate freely.

The gas flow in the humidifying apparatus 3 will be described in the order of the moistening off-gas MG, hydrogen gas Hd and air Ad.

The moistening off-gas MG containing much moisture, which is discharged as the cathode off-gas COG from the cathode 2a of the fuel cell 2, passes through the pipe 21 and is introduced into an off-gas inlet 38 of the first humidifier 31, part of the humidifying apparatus 3, then diverges into hollows of many first hollow fiber membranes P1 housed in the four pieces of hollow fiber membrane module 33. Part of the moisture contained in the moistening off-gas MG condensates on the internal circumferential surfaces of the first hollow fiber membranes P1, when it flows through the hollows of the first hollow fiber membranes P1. The condensed moisture is collected by the hydrogen gas Hd as described above.

The moistening off-gas MG coming out of the other end of the hollow fiber membrane module 33 is discharged through an off-gas outlet 40 of the first humidifier 31, and introduced into the second humidifier 32 through the pipe 22.

The moistening off-gas MG introduced into the second humidifier 32 diverges into the hollows of many second hollow fiber membranes P2 housed in the four pieces of hollow fiber module. Part of the moisture contained in the moistening off-gas MG condenses on the inner circumferential surfaces of the second hollow fiber membranes P2, when it flows through the hollows of the second hollow fiber membranes P2. And part of the moisture diffuses into the pores of the second hollow fiber membranes P2. The moisture condensed or diffused in the pores is collected by the air Ad as described before. The moistening off-gas MG coming out of the hollow fiber module 33 is discharged from the second humidifier 32 into the atmosphere through the pipe 23.

The hydrogen gas Hd is introduced into the hydrogen inlet 41 of the first humidifier 31 through an injector 7 and the pipe 24. It then enters the housing 36 of the hollow fiber membrane module 33 through the inlet 37a and flows in the longitudinal direction of the hollow fiber membrane module 33. The hydrogen gas Hd is humidified by receiving the moisture exuded on the outer circumferential surfaces of the first hollow fiber membranes P1. Subsequently, it flows out through the outlet 37b and is discharged as the humidified hydrogen gas Hw through the hydrogen gas outlet 39, then introduced into the anode 2b of the fuel cell 2 through the pipe 25.

On the other hand, the air Ad is introduced into the second humidifier 32 of the humidifying apparatus 3 through the air compressor 5 and the pipe 26 and flows inside the hollow fiber membrane module 33. The air Ad is humidified to be the humidified air Aw by receiving the moisture exuded on the outer circumferential surfaces of the second hollow fiber membranes P2 or diffused through the pores. The humidified air Aw discharged from the second humidifier 32 is introduced into the cathode 2a of the fuel cell 2 through the pipe 27. Though the second hollow fiber membranes P2 may possibly be permeable to gasses like oxygen gas, the mixture of the oxygen gas with the air Ad, which is to be humidified in the second humidifier 32, will not affect the fuel cell 2 adversely.

The porous water permeable membrane used for the second hollow fiber membranes P2 generally has a good heat resistance and withstands if heated up to as much as 200 degrees Celsius. So the air Ad, the temperature of which is raised by the heats of compression when it is compressed in the compressor 5, can be introduced into the second humidifier without cooling it.

If the temperature of the introduced air Ad is high, the moisture will easily evaporate on the outer circumferential surfaces of the second hollow fiber membranes P2, and also it is anticipated the quantity of water vapor the air Ad can contain will increase. So it will lead to the supply of more moisture to the fuel cell 2 and the improvement of the efficiency of power generation. Further, since the pores of the second hollow fiber membranes P2 also serve as promoting the moisture permeation, they contribute to the improvement of the efficiency of power generation. The first hollow fiber membranes P1 composed of the non-porous water permeable membranes may be used for the second humidifier 32 instead.

Another embodiment of the invention will be described with the reference to FIG. 4. The explanation of the same elements as those shown in FIG. 2 will be omitted, using the same symbols.

Figure 4:
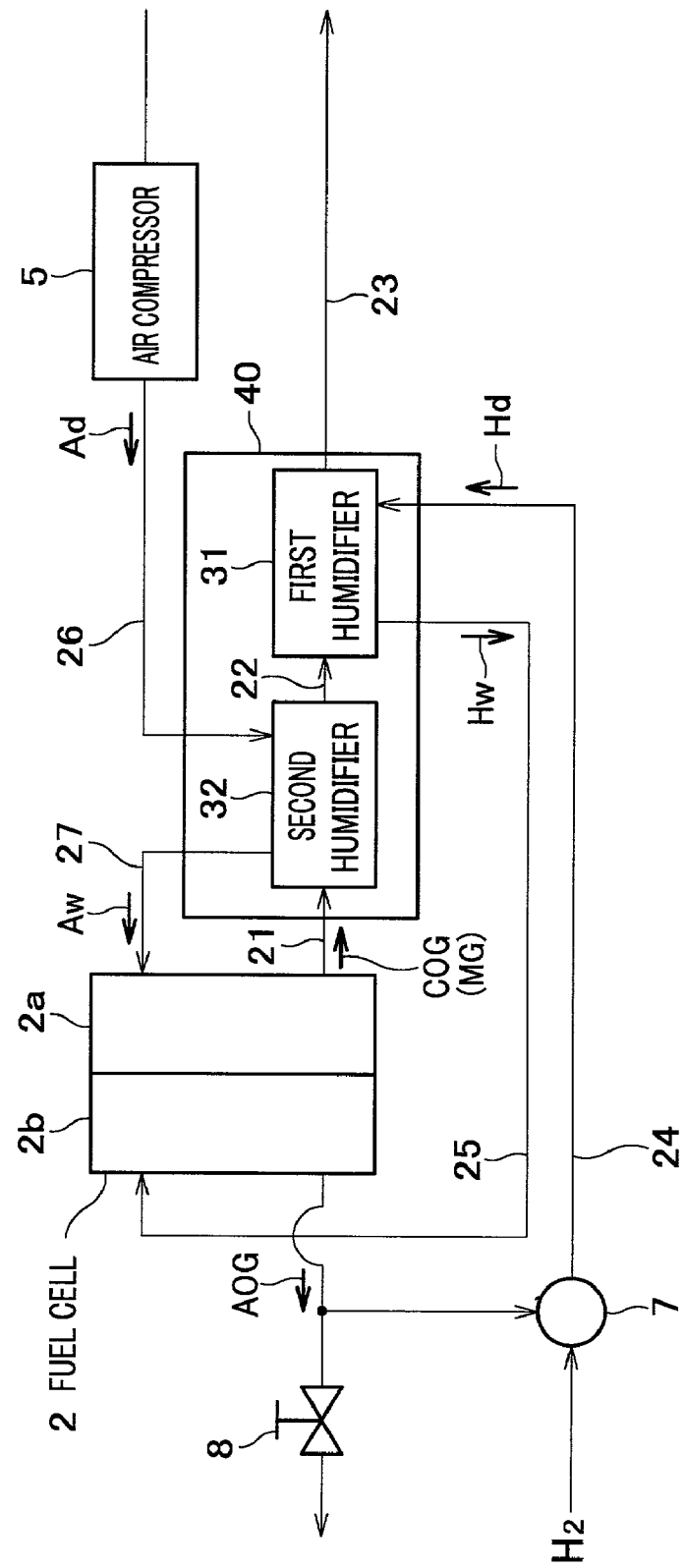
FIG. 4 is a view illustrating the structure of a fuel cell and a humidifying apparatus according to another preferable embodiment of the present invention.

As shown in FIG. 4, a humidifying apparatus 40 includes the first and second humidifiers 31, 32. The first humidifier 31 humidifies the hydrogen gas Hd and the second humidifier humidifies the air Aw. The embodiment is the same as that according to FIG. 2 except for the fact that the moistening off-gas MG is first introduced into the second humidifier and then into the first humidifier 31.

The moistening off-gas MG is capable of supplying the larger amount of moisture to the fuel cell 2 with the air as carrier gas, since it humidifies the relatively high temperature air Ad under the conditions of high gas temperature. Especially when the second humidifier 32 employs the second hollow fiber membranes P2 with pores, which have high water permeability, the moistening off-gas MG can supply a large amount of moisture to the fuel cell 2. Therefore, according to the embodiment, a sufficient humidification of the cathode 2a is attained.

In this case, since the drop in the temperature of the moistening off-gas MG in the second humidifier 32 is small or on the contrary it is heated up by the air Ad, it is capable of humidifying the hydrogen gas Hd sufficiently in the first humidifier 31 placed after the second humidifier 32.

Because the hollow fiber membranes used for the first humidifier 31 are the hollow fiber membranes P1 of the water permeable membrane made of the non-porous polymer membrane same as the former embodiment, according to this embodiment the mixture of the oxygen gas with the hydrogen gas Hd will be prevented during the humidification of the hydrogen gas Hd. Also because the hollow fiber membranes used for the second humidifier 32 are the hollow fiber membranes P2 of the water permeable membrane made of the heat resistant and porous polymer membrane same as the former embodiment, the air Ad of high temperature with the compression heats by the air compressor 5 can be introduced into the second humidifier 32.

Another embodiment of the invention will be described with the reference to FIG. 5. The explanation of the same elements as those shown in FIG. 2 will be omitted, using the same symbols.

Figure 5:
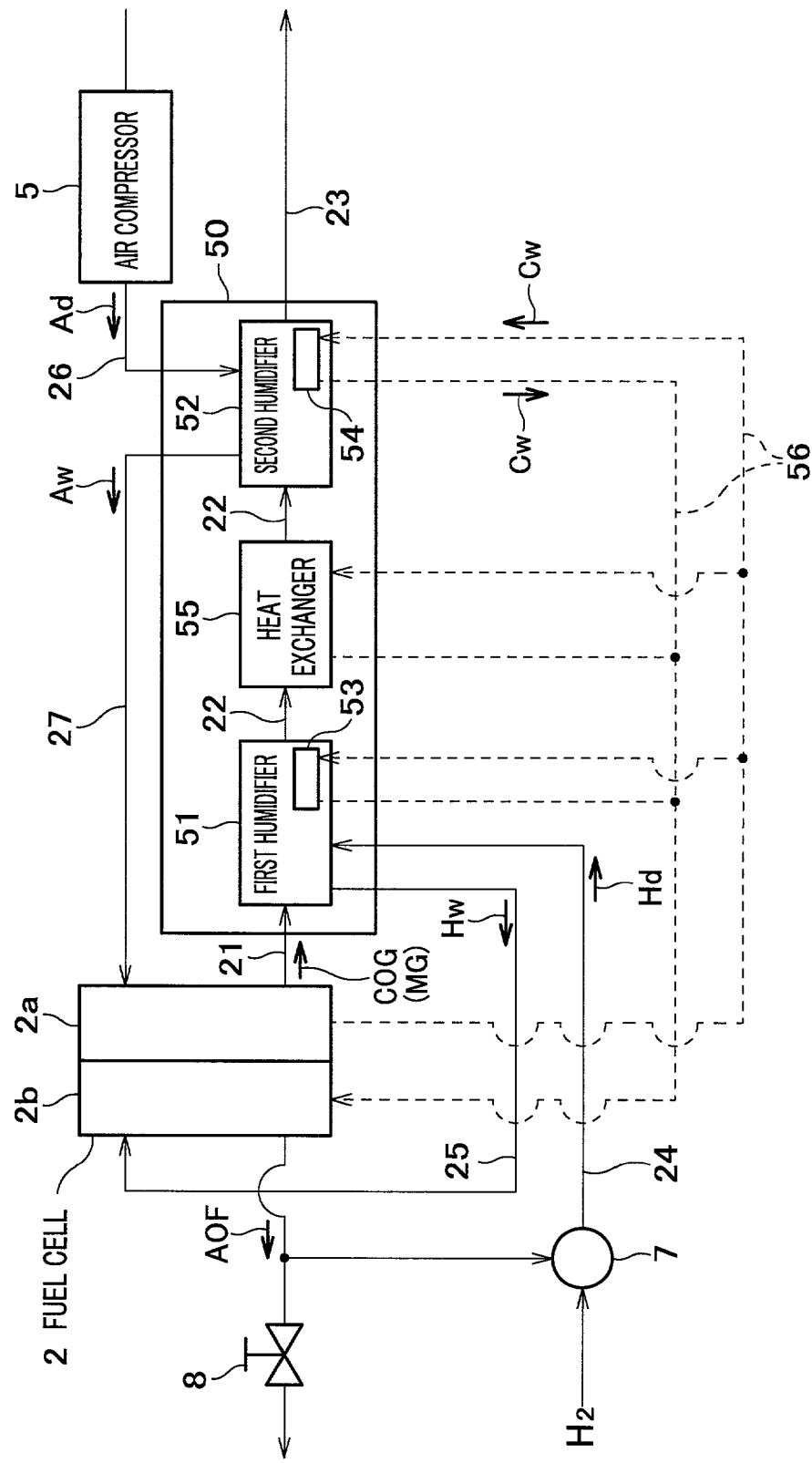
FIG. 5 is a view illustrating the structure of a fuel cell and a humidifying apparatus according to another preferable embodiment of the present invention.

As shown in FIG. 5, the embodiment is the same as that shown in FIG. 2; a humidifying apparatus 50 includes a first and a second humidifiers 51 and 52, the first humidifier 51 humidifies the hydrogen gas Hd and the second humidifier humidifies the air Aw, and the disposition of the first and second humidifiers 51 and 52. However, according to the embodiment the humidifying apparatus 50 has a heating means to heat the gases. The heating means includes a heat exchanging means 53 in the first humidifier 51, a heat exchanging means 54 in the second humidifier 52 and a heat exchanger 55 provided in the middle of the pipe 22 between the first and second humidifiers 51, 52. The first and second humidifiers 51, 52 are the same as those shown in FIGS. 3(a) and 3(b) except for the heat exchanging means 53 and 54.

The heating means of the humidifier 50 will be described in the order of the heat exchanging means 53, 54 and the heat exchanger 55.

Figure 3A:
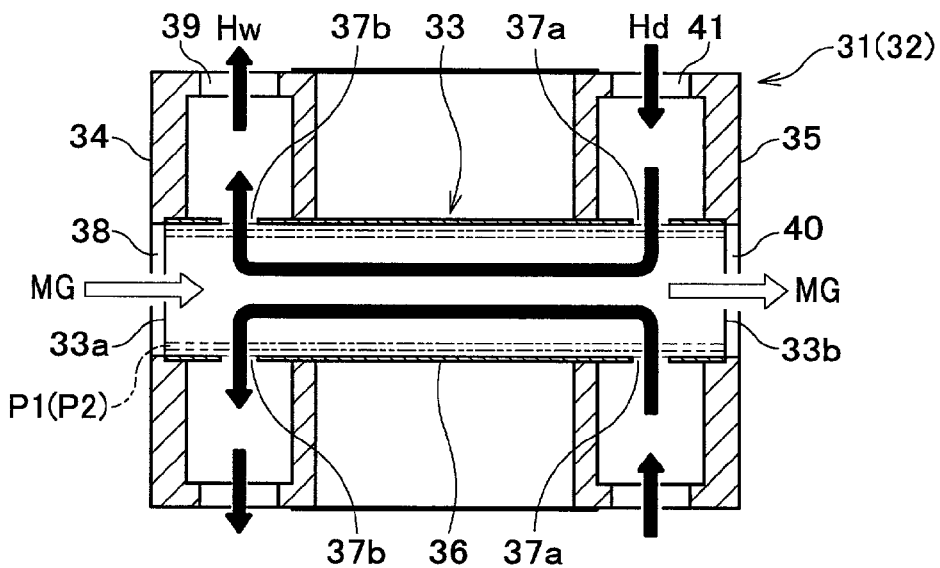
FIG. 3(a) is a view showing the longitudinal section of a first humidifier.
Figure 3B:
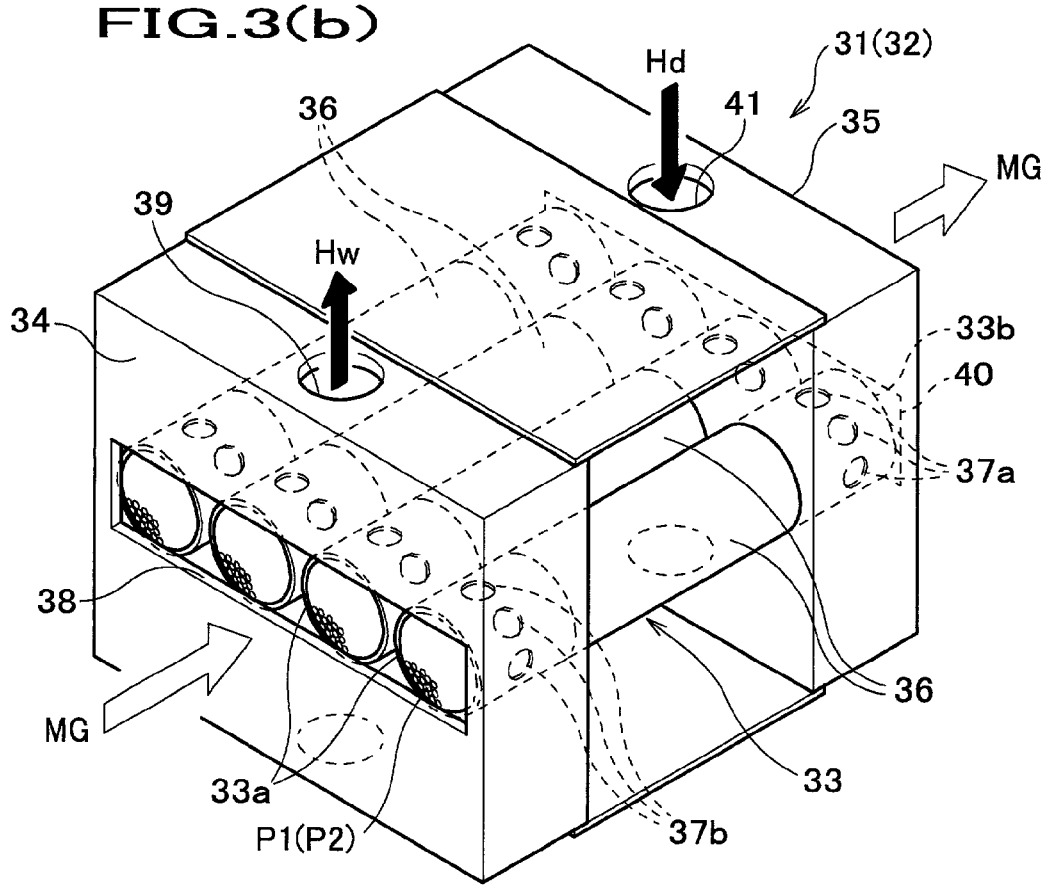
FIG. 3(b) is a perspective view of a first humidifier.

The heat exchanging means 53 and 54 employ a jacket type device including a tube, which covers the outer circumferential surface of the hollow fiber membrane module 33 shown in FIG. 3(a). Circulating water CW is circulated in the tube from one to the other end of the hollow fiber membrane module 33 in its longitudinal direction. The circulating water CW is thus capable of heating the hydrogen gas Hd, air Ad, moistening off-gas MG, and the first and second hollow membranes P1, P2 by transferring the heat through the housing 36 of the hollow fiber membrane module 33. A circulating water line 56 connected to the fuel cell 2 performs the introduction and discharge of the circulating water CW into and from the heat exchanging means 53, 54. The heat exchanging means 53, 54 may not be limited to those shown in the figure so long as they can transfer the heats possessed by the circulating water CW to the hydrogen gas Hd etc.

The heat exchanger 55, including a tube covering the pipe 22, in which the moistening off-gas MG flows after passing through the first humidifier 51, and a pipe winding spirally round the pipe 22, is placed between the first and second humidifiers 51 an 52. This heat exchanger 55 is capable of preventing the condensation of moisture of the moistening off-gas MG to be introduced into the second humidifier 52 and promoting the reevaporation of it, thereby improving the efficiency of humidification of the air Ad in the second humidifier 52. The introduction and discharge of the circulating water CW into and from the heat exchanger 55 are also performed by the circulating water line 56.

The quantity of moisture to be contained in the hydrogen gas Hd and the air Ad can be increased by heating the moistening off-gas MG, the hydrogen gas Hd and the air Ad with the heating means. Therefore, since the heating means can help supply the moisture to the solid electrolyte membrane of the fuel cell 2 stably and increase the proton conductivity so that the number of protons (hydrogen ions) passing through the solid electrolyte membrane will increase and the efficiency of electrical power generation will be improved.

The circulating water CW is cooled with the heat exchange by the heat exchanging means 53, 54 and the heat exchanger 55. And the cooled circulated water CW is reused for cooling the fuel cell 2, thus achieving an efficient recycling of the waste heat of the fuel cell 2.

It will now be appreciated from the foregoing description that the present invention is not limited to the particular illustrated embodiments discussed above and may be carried out in various modified forms. For example in the humidifying apparatus 3, the first and second humidifiers 31 and 32 can be placed in parallel for the flow of the moistening off-gas MG instead of in series shown in FIGS. 2, 4 and 5.

The water permeable membrane is not limited to the hollow fiber membranes P1 and P2, but arbitrary shapes such as a sheet can be used as substitute.

Though the cathode off-gas COG has been used for the moistening off-gas MG, the anode off-gas AOG can be an alternative when it contains much moisture. In this case, the non-porous water permeable membrane would be preferable for the second humidifier 32, which humidifies the air Ad, since the alternative moistening off-gas MG possibly contains the hydrogen gas Hd before reaction.

The heating means may be provided only for the first humidifier 51, the second humidifier 52 or the pipe 22. Also it may be provided for the pipe 25 between the fuel cell 2 and the first humidifier 51, or the pipe 27 between the fuel cell 2 and the second humidifier 52. Especially when both pipes 25 and 27 are heated, the humidified hydrogen gas Hw and humidified air Aw will be prevented from being cooled down to condense in the pipes 25 and 27 before they are supplied to the fuel cell 2.

Further, the heater with a given structure may be selected in addition to the heat exchanging means 53, 54 and the heat exchanger 55. The use of heater will enable a sufficient supply of moisture to the solid electrolyte membrane of the fuel cell 2, since the moistening off-gas MG, the hydrogen gas Hd and the air Ad are heated up to high temperature.

A cooling device to cool down the air Ad to a given temperature may be placed between the air compressor 5 and the second humidifier 52. Even if the temperature of the air Ad coming out of the compressor 5 is higher than the required value, it will be cooled down to help maintain the durability of the water permeable membrane.

What is claimed is:

1. A fuel cell system, which has a fuel cell that generates electrical power by the electrochemical reaction between a fuel gas supplied to an anode and an oxidant gas supplied to a cathode, and a humidifying apparatus that humidifies the gases with water permeable membranes, comprising:
    a first humidifier, which is provided in said humidifying apparatus; and
    non-porous water permeable membranes having a pore size less than 10 nanometers, which are provided in said first humidifier to humidify said fuel gas supplied to said anode by means of the moisture contained in off-gas discharged from said fuel cell,
    wherein said humidifying apparatus has a second humidifier, and said second humidifier has porous water permeable membranes having a pore size of 10 nanometers or greater, which humidify said oxidant gas supplied to said cathode by means of said off-gas.

2. The fuel cell system according to claim 1, wherein:
    said first and second humidifiers are so disposed in said humidifying apparatus that said off-gas first passes through said first humidifier and then reaches said second humidifier.

3. The fuel cell system according to claim 1, wherein:
said fuel cell system, said first humidifier and said second humidifier are disposed in series for the flow of said off-gas.

4. The fuel cell system according to claim 1, wherein said off-gas is discharged from the cathode.

5. The fuel cell system according to claim 1, wherein said non-porous water permeable membranes transport water by ion hydration.

6. The fuel cell system according to claim 4, wherein said non-porous water permeable membranes transport water by ion hydration.

7. The fuel cell system according to claim 1, wherein said porous water permeable membranes transport water by capillary condensation.

8. A method of humidifying fuel and oxidant gases supplied to a fuel cell in a humidifying apparatus, comprising:
introducing moisture containing off-gas discharged from said fuel cell into said humidifying apparatus;
introducing moisture into said fuel gas from said off-gas through non-porous water permeable membranes having a pore size less than 10 nanometers in said humidifying apparatus;
introducing moisture into said oxidant gas from said off-gas through porous water permeable membranes having a pore size of 10 nanometers or greater in said humidifying apparatus; and
supplying said fuel and oxidant gases to said fuel cell.

* * * * *